United States Patent [19]

Pham et al.

[11] Patent Number: 4,884,903

[45] Date of Patent: Dec. 5, 1989

[54] INTER-SHAFT BEARING FOR MULTIPLE BODY TURBO-ENGINES

[75] Inventors: Lucien Pham, Le Mee sur Seine; Jean-Claude C. Taillant, Evry, both of France

[73] Assignee: Societe Nationale D'Etude et de Construction de Moteurs D'Aviation "S.N.E.C.M.A.", Paris, France

[21] Appl. No.: 330,477

[22] Filed: Mar. 30, 1989

[30] Foreign Application Priority Data

Mar. 30, 1988 [FR] France .................................. 88 04162

[51] Int. Cl.⁴ .......................... F16C 25/08; F16C 33/66
[52] U.S. Cl. ..................................... 384/563; 384/467; 384/557
[58] Field of Search ................. 384/99, 467, 517, 519, 384/538, 563, 557, 583

[56] References Cited

U.S. PATENT DOCUMENTS 4,283,096 8/1981 Picard et al. .
4,676,667 6/1987 Komatsu et al. ...................... 384/99

FOREIGN PATENT DOCUMENTS 42320 12/1981 European Pat. Off. .
83266 7/1983 European Pat. Off. .
886255 1/1962 United Kingdom .
1130279 10/1968 United Kingdom .
2183736 6/1987 United Kingdom .

*Primary Examiner*—Thomas R. Hannon
*Attorney, Agent, or Firm*—Oblon, Spivak, McClelland, Maier & Neustadt

[57] ABSTRACT

An inter-shaft bearing in a multiple body turbo-engine having an outer first shaft and an inner second shaft comprises bearing rollers disposed between an outer ring mounted on the first shaft and an inner ring mounted on the second shaft. The first shaft and the outer ring are provided with cooperating conical surfaces, and a plurality of fly-weights are disposed between the rear face of the outer ring and a retaining nut mounted on the first shaft. Each of the fly-weights has an inclined rear face which cooperates with a conical surface of the nut so that when centrifugal action during operation of the engine causes the fly-weights to move radially outwards they are simultaneously forced axially forwards to exert a thrust on the outer ring which thus tends to restrain the bearing through the action of the cooperating conical surfaces of the outer ring and the first shaft, thereby controlling bearing play.

5 Claims, 2 Drawing Sheets

FIG:1

INTER-SHAFT BEARING FOR MULTIPLE BODY TURBO-ENGINES

BACKGROUND OF THE INVENTION

1. Field of the Invention

The present invention relates to an inter-shaft bearing for a multiple body turbo-engine fitted with means for controlling play during operation.

Some turbo-engines of the multiple body type comprise a bearing which rotatably supports a first shaft relative to a second shaft and which generally comprises bearing rollers disposed between an outer ring mounted on the first shaft and an inner ring mounted on the second shaft. This is particularly the case when the outer first shaft is constituted by the downstream journal of the shaft train of the high pressure body, and the inner second shaft is constituted by the downstream journal of the shaft train of the low pressure body.

2. Summary of the prior art

Apart from the intended mechanical functions of such bearings, arrangements are usually provided to ensure lubrication and cooling of the bearings, making use of various generally known solutions. An example of this is disclosed in European Patent Application No. 042 320, which also proposes the use of a film of pressurized oil to ensure the damping of vibrations of the shafts and the bearing which often arise during operation under the severe conditions occurring in high performance turbo-engines.

However, substantial play during operation may arise in some inter-shaft bearings, due, in particular, to differential expansions arising from thermal differences, and differences in centrifugal forces corresponding to different rotational speeds. European Patent Application No. 083 266 has proposed a partial solution by improving control over the temperature of a shaft by the circulation of oil in longitudinal channels provided inside the shaft. It has also been tried to fit a prestressed bearing or to use a collar, e.g. in accordance with U.S. Pat. No. 4,283,096.

The earlier mentioned European Patent Application No. 042 320 envisages mounting a shaft of the high pressure body, which is susceptible to being heated to higher temperatures and of rotating at higher speeds, inside the shaft of the low pressure body, which makes it possible to reduce play during operation. However, this type of assembly is not usable in certain applications and, in addition, it involves difficulties in determining the development of play during operation. Also, this solution, just as the solutions involving banding or prestressing, is subject to the risk of over-tightening during operation, which is prejudicial to the life of the bearing. Consequently, in the absence of a completely satisfactory solution, there remain in intershaft bearings, particularly in turbo-engines, problems of high amplitude vibrations and loads associated with the orbiting of the rotor of the high pressure body as a result of bearing play, which may become substantial during operation.

SUMMARY OF THE INVENTION

It is an object of the present invention to avoid the drawbacks of the previous solutions discussed above and to provide efficient control of the radial play likely to develop during operation of an inter-shaft bearing under the influence of differential thermal and mechanical effects due to centrifugal action.

Accordingly, the invention provides an inter-shaft bearing assembly in a multiple body turbo-engine including an outer first shaft and an inner first shaft, said bearing assembly supporting said first shaft for rotation relative to said second shaft and comprising:

an inner ring mounted on the outer face of said second shaft, an outer ring mounted on the inner face of said first shaft, said outer ring having upstream and downstream ends relative to the direction of gas flow through the turbo-engine, a plurality of bearing rollers disposed between said inner and outer rings, at least one conical surface on the outer face of said outer ring, at least one conical surface on said inner face of said first shaft adapted to cooperate with said at least one conical surface of said outer ring, a retaining nut mounted on said first shaft downstream of said outer ring, a plurality of fly-weights disposed between said retaining nut and said downstream end of said outer ring, each of said fly-weights having a generally trapezoidal shape in cross-section providing said fly-weight with an inclined face on its downstream side, and a conical surface on the upstream face of said retaining nut adapted to cooperate with said inclined faces of said fly-weights whereby, during operation of said turbo-engine, radially outward centrifugal movement of said fly-weights exerts an axial thrust on said outer ring as a result of cooperation between said inclined faces of said fly-weights and said conical surface of said retaining nut, said axial thrust acting to restrain the bearing formed by said inner and outer rings and said bearing rollers therebetween through the cooperation of said at least one conical surface of said outer ring and said at least one conical surface of said first shaft, thereby controlling the play likely to develop between said outer ring and said first shaft as a function of the rotational speed of said turbo-engine.

Other characteristics and advantages of the invention will become apparent from the following description of two embodiments of the invention with reference to the drawings.

DESCRIPTION OF THE PREFERRED EMBODIMENTS

Figure 1:
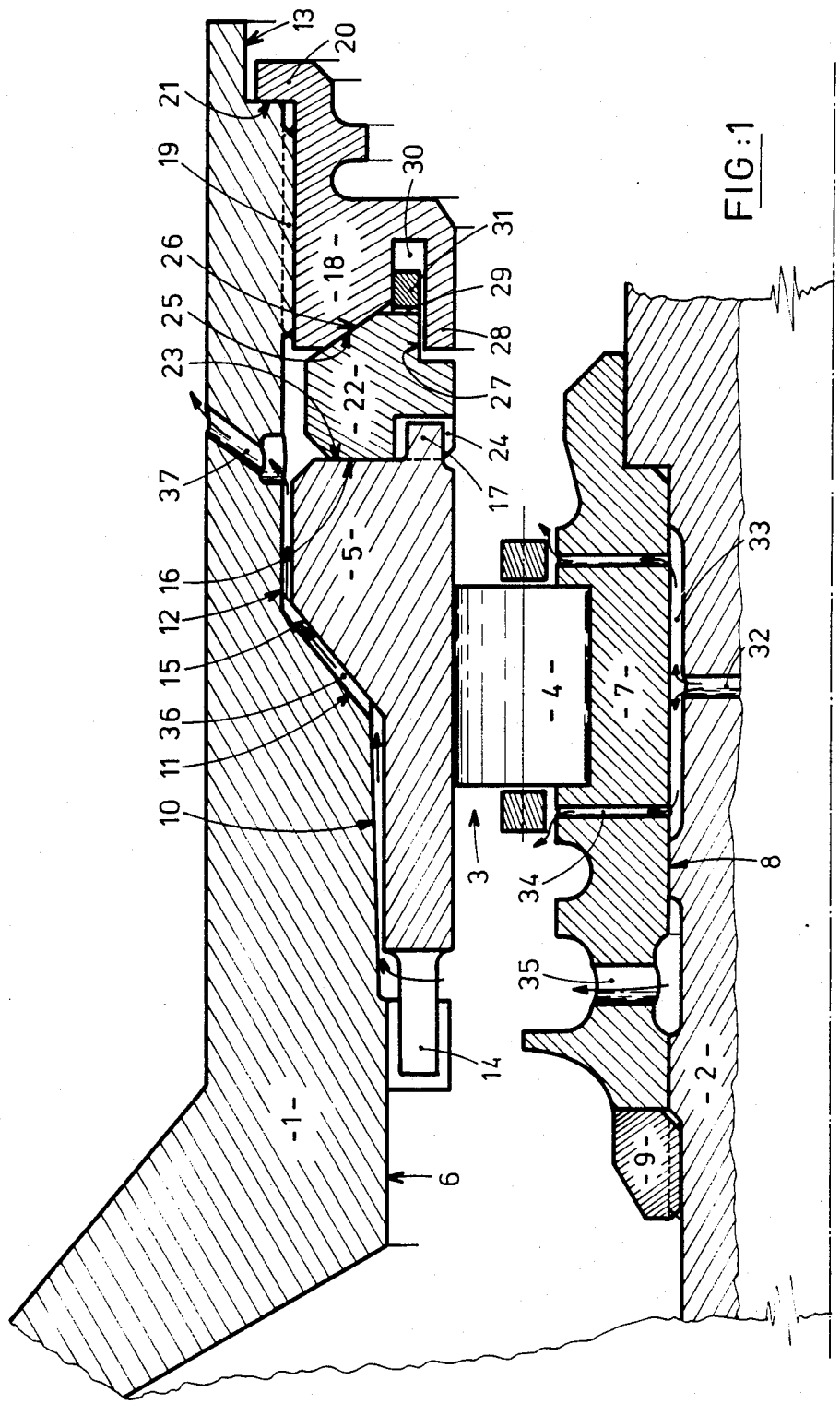
FIG. 1 is an axial section through part of a multiple body turbo-engine showing a first embodiment of an inter-shaft bearing assembly in accordance with the invention.

The part of the multiple body turbo-engine shown in axial section in FIG. 1 comprises a first shaft 1, which is the downstream journal of the shaft line of the high pressure body of the turbo-engine, and a second shaft which is situated inside the first shaft 1 and is the downstream journal of the shaft line of the low pressure body of the turbo-engine. The said shafts 1 and 2 are rotatably supported relative to each other by a roller bearing 3 comprising rollers 4 inserted between races provide by an outer ring 5 mounted directly on the inner face 6 of the first shaft 1 and an inner ring 7 mounted on the outer face 8 of the second shaft 2. These elements constitute an intershaft bearing of the multiple body turbo-engine. The inner ring 7 is secured in position by a locknut 9 at its upstream side, upstream and downstream being defined herein relative to the normal direction of the flow of gases through the turbo-engine, which may also be regarded as from front to rear.

The inner face 6 of the first shaft 1 comprises, from upstream to downstream, a first conical surface 10 of low conicity and diverging rearwardly, a second rearwardly diverging conical surface 11 following on from the surface 10 and having a conicity angle close to 40 degrees relative to the axis of the turbo-engine, and finally two successive cylindrical portions 12 and 13 respectively.

The outer ring 5 comprises, at its upstream side, forwardly extending fingers 14 which engage with means on the inner face 6 of the first shaft 1 to provide tangential support for the ring 5 and also to lock the ring 5 for rotation with the shaft 1. At the level of the second conical surface 11 of the first shaft 1, the ring 5 has a cooperating conical surface 15. At its downstream end the ring 5 has a flat radial face 16 extending perpendicularly with respect to the axis of the turbo-engine and provided with rearwardly projecting fingers 17 adjacent its radially inner edge.

An externally threaded retaining nut 18 is screwed on a downstream threaded part 19 of the cylindrical portion 12 of the inner face 6 of the first shaft 1 and comprises a collar 20 which, on tightening, bears on a radial face 21 of the first shaft between the cylindrical portions 12 and 13. Between the outer ring 5 and the retaining nut 18 there are a plurality of fly-weights 22, the upstream faces 23 of which cooperate with the downstream face 16 of the outer ring 5. The upstream face 23 of each fly-weight has a notch 24 for receiving one of the rear fingers 17 of the ring 5 to prevent rotation of the fly-weights 22 relative to the ring 5 and the first shaft 1. On its downstream side, each fly-weight 22 has a sloping face 25 which cooperates with a forwardly divergent conical surface 26 provided on the upstream side of the nut 18. Also on its downstream side each fly-weight 22 has a cylindrical rebate 27 at its radially inner edge which receives a cylindrical upstream projection 28 of the nut 18. Between the cylindrical rebate 27 and the sloping surface 25, each fly-weight 22 has a radially extending thrust surface 29. Correspondingly, between the projection 28 and the conical surface 26, the retaining nut 18 has an annular groove 30 which houses a spring 31. This spring 31, the function of which will be explained below, is corrugated in the axial direction so that it bears, on the one hand, on the thrust surface 29 of the fly-weights 22 and, on the other hand, on the base of the groove 30 of the nut 18.

Arrangements, such as are currently known in principle, are also provided for oil circulation through the bearing 3 for lubricating and cooling the bearing. Thus, the inner second shaft 2 has ducts such as 32 for oil inflow which, via longitudinal grooves 33 and ducts 34 in the inner ring 7, reaches the bearing 3. In addition, via a port 35 in the inner ring 7, the oil passes through the passages between the forward fingers 14 of the outer ring 5 to the space between the inner face 6 of the first shaft 1 and the outer face of the ring 5. On the conical surface 11 of the first shaft 1 there are provided oil flow channels 36, and an oil return port such as 37 is provided in the first shaft 1. This oil circulation is indicated by arrows in FIG. 1.

Similarly, a known system of ventilation of the enclosures is also applied without adversely affecting the arrangements of the invention.

The operation of the arrangement for controlling play in the inter-shaft bearing assembly just described and diagrammatically represented in FIG. 1 is as follows.

At rest, the fly-weights 22 are held radially in position by the cylindrical projection 28 of the nut 18 cooperating with the cylindrical rebate 27 of each fly-weight. At the same time, contact between the cooperating conical surface 11 and 15 of the first shaft 1 and the outer ring 5 respectively is maintained under the action of the forward axial thrust exerted by the spring 31 acting through the fly-weights 22 on the downstream face 16 of the outer ring 5.

When the multiple body turbo-engine operates at high speed, the radial expansion of the first shaft caused by the thermal effects arising from the rise in temperature and the centrifugal mechanical effects arising from the high rotational speeds, would tend to increase the play between the first shaft 1 and the outer ring 5 were it not for the presence of the play control arrangement in accordance with the invention. The centrifugal mechanical forces due to the rotation of the shaft 1 are also exerted on the fly-weights 22, which tend to move radially outwards and, consequently, also to move along the inclined plane defined by the surface 26 of the nut 18. In so doing, the reaction between the fly-weights 22 and the said nut 18 exerts a forward axial thrust on the outer ring 5 which maintains the ring 5 in contact with the first shaft 1 in the region of their respective cooperating conical surfaces 15 and 11. The axial force between these surfaces develops a radial component which presses the outer ring 5 from the shaft 1 and reduces the play, thereby cancelling the previous effect of increasing the play between the outer ring 5 and the first shaft 1.

The low play thus obtained during operation prevents the drawbacks which result from the risk of orbiting of the shaft, bringing about eccentricities and adverse effects on other bearings, or the development of negative play at various points between the rotor and stator of the turbo-engine, or resulting also from the occurrence of harmful vibrations.

The choice of material for the fly-weights 22 may enable the centrifugal forces obtained and the resulting axial stress exerted on the outer ring 5 to be adapted to desired values, depending on the particular conditions of the application concerned. Values ranging from 3 to 7 tonnes have thus been obtained in one application, depending on whether the material used was steel or tungsten.

A spherical profile of low curvature may be provided for the inclined surface 15 of the outer ring 5 so as to compensate for tapering of the first shaft 1 during operation. The expansion of the outer ring itself due to centrifugal effects during operation may be compensated by providing a corresponding pre-shrinking in the cold state. It will also be noted that the reduction of the contact area between the first shaft 1 and the outer ring 5 in the region of the surfaces 11 and 15 has the advantage of reducing heat exchange by conduction between the first shaft 1 and said outer ring 5.

Figure 2:
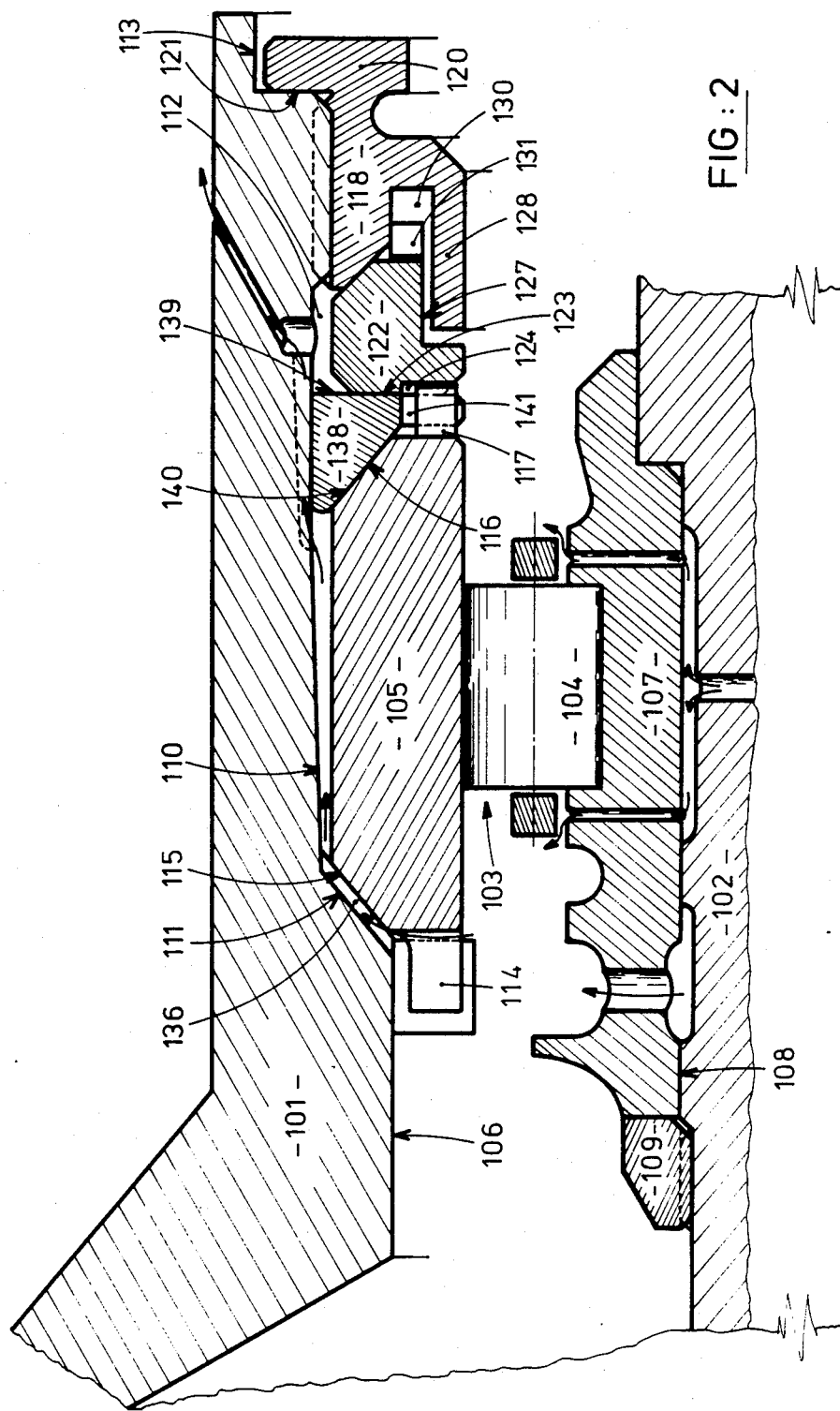
FIG. 2 is a view similar to that of FIG. 1, but showing a second embodiment of an inter-shaft bearing assembly in accordance with the invention.

FIG. 2 shows a second embodiment of an inter-shaft bearing in accordance with the invention incorporating some modifications. Components of the second embodiment which are identical or similar to components of the first embodiment are given the same reference numberals plus one hundred. As before, the bearing 103 comprises rollers 104 mounted between an outer ring 105 and an inner ring 107 respectively mounted on an outer first shaft 101 and an inner second shaft 102 by means of nuts 118 and 109 respectively. The fly-weights 122 are also present.

However, in contrast to the first embodiment represented in FIG. 1, the positions of the conical surfaces 111 and 110 provided on the inner face 106 of the first shaft 101 are reversed, the higher conicity surface 111 being located upstream and cooperating with a conical surface 115 forming an upstream surface of the outer ring 105. As before, channels 136 are provided on the conical surface 111 of the first shaft 101, and the cylindrical portions 112 and 113 of the inner face 106 of the first shaft are retained. At its downstream end the outer ring 105 has an inclined face 116, and segmented wedges 138 are inserted between this face 116 and the fly-weights 122, each wedge having a plane downstream radial face 139 which cooperates with the upstream face 123 of a fly-weight 122, and an inclined upstream face 140 which cooperates with the downstream face 116 of the outer ring 105. The rear fingers 117 of the outer ring 105 cooperate, not only with notches 124 of the fly-weights as in the first embodiment, but also with notches 141 in the inner edges of the wedges 138 so that they are locked rotationally with the outer ring 105.

As before, the nut 118 has a downstream collar 120 engaging with a radial face 121 between the cylindrical portions 112 and 113 of the first shaft 101, and on its upstream side the nut has a cylindrical projection 128 which cooperates with a downstream rebate 127 in the inner face of each of the fly-weights 122, and an annular groove 130 in which an axial thrust spring 131 is housed.

The operation of this second embodiment is virtually identical to that of the first embodiment described with reference to FIG. 1, except that the wedges 138 are involved in the transmission of the axial thrust from the fly-weights 122 to the outer ring 105 and assist in the control of the play between the said outer ring 105 and the first shaft 101.

We claim:

1. An inter-shaft bearing assembly in a multiple body turbo-engine including an outer first shaft and an inner second shaft, said inter-shaft bearing assembly supporting said first shaft for rotation relative to said second shaft and comprising:
    an inner ring mounted on the outer face of said second shaft,
    an outer ring mounted on the inner face of said first shaft, said outer ring having upstream and downstream ends relative to the direction of gas flow through the turbo-engine,
    a plurality of bearing rollers disposed between said inner and outer rings,
    at least one conical surface on the outer face of said outer ring,
    at least one conical surface on said inner face of said first shaft adapted to cooperate with said at least one conical surface of said outer ring,
    a retaining nut mounted on said first shaft downstream of said outer ring,
    a plurality of fly-weights disposed between said retaining nut and said downstream end of said outer ring, each of said fly-weights having a generally trapezoidal shape in cross-section providing said fly-weight with an inclined face on its downstream side, and
    a conical surface on the upstream face of said retaining nut adapted to cooperate with said inclined faces of said fly-weights whereby, during operation of said turbo-engine, radially outward centrifugal movement of said fly-weights exerts an axial thrust on said outer ring as a result of cooperation between said inclined faces of said fly-weights and said conical surface of said retaining nut, said axial thrust acting to restrain the bearing formed by said inner and outer rings and said bearing rollers therebetween through the cooperation of said at least one conical surface of said outer ring and said at least one conical surface of said first shaft, thereby controlling the play likely to develop between said outer ring and said first shaft as a function of the rotational speed of said turbo-engine.

2. An inter-shaft bearing assembly according to claim 1, wherein said inner face of said first shaft defines a first conical surface of low conicity, a second conical surface following downstream from said first conical surface and diverging in the downstream direction at an angle of about 40 degrees relative to the axis of said turbo-engine, two successive cylindrical surfaces following downstream from said second conical surface, and a radial face between said cylindrical surfaces,
    said outer ring comprises front fingers extending upstream at said upstream end of said outer ring and cooperating with said first shaft to prevent rotation of said outer ring relative to said first shaft, a flat radial face disposed perpendicular to the axis of said turbo-engine at said downstream end of said outer ring, and rear fingers extending downstream from said flat radial face,
    said fly-weights having an upstream face acting on said radial downstream face of said outer ring, notches in said upstream face receiving said rear fingers of said outer ring to prevent rotation of said fly-weights relative to said outer ring, and an inwardly facing surface at the inner downstream edge of said fly-weights, and
    said retaining nut comprises a cylindrical projection extending upstream at the inner edge of said upstream face of said nut for cooperating with said inwardly facing surface of each of said fly-weights, an annular groove in said upstream face of said nut between said cylindrical projection and said conical surface thereof, said groove housing a spring adapted to act axially between said nut and said fly-weights, and a collar at the downstream side of said nut cooperating with said radial face of said first shaft.

3. An inter-shaft bearing assembly according to claim 1, wherein said inner face of said first shaft defines a first conical surface diverging in the downstream direction at an angle of about 40 degrees relative to the axis of said turbo-engine, a second conical surface of low conicity following downstream from said first conical surface, two successive cylindrical surfaces following downstream from said second conical surface, and a radial face between said cylindrical surfaces,
    said outer ring comprises front fingers extending upstream at said upstream end of said outer ring and cooperating with said first shaft to prevent rotation of said outer ring relative to said first shaft, a conical surface at said downstream end of said outer ring converging in the downstream direction at an angle of about 40 degrees relative to the axis of said turbo-engine, and rear fingers extending downstream at the inner edge of said downstream conical surface of said outer ring, said assembly further comprises segmented wedges disposed between said downstream end of said outer ring and said fly-weights, said wedges having a sloping face on the upstream side thereof cooperating with said downstream conical surface of said outer ring, a radial face on the downstream side thereof, and an inner face provided with notches engaging with said rear fingers of said outer ring to prevent rotation of said wedges relative to said outer ring, said fly-weights have an upstream face acting on said radial downstream face of said wedges, notches in said upstream face receiving said rear fingers of said outer ring to prevent rotation of said fly-weights relative to said outer ring, and an inwardly facing surface at the inner downstream edge of said fly-weights, and said retaining nut comprises a cylindrical projection extending upstream at the inner edge of said upstream face of said nut for cooperating with said inwardly facing surface of each of said fly-weights, an annular groove in said upstream face of said nut between said cylindrical projection and said conical surface thereof, said groove housing a spring adapted to act axially between said nut and said fly-weights, and a collar at the downstream side of said nut cooperating with said radial face of said first shaft.

4. An inter-shaft bearing assembly according to claim 1, wherein said at least one conical surface of said first shaft cooperating with said at least one conical surface of said outer ring is provided with channels for oil flow and cooling.

5. An inter-shaft bearing assembly according to claim 1, wherein said first shaft is constituted by the downstream journal of the shaft line of the high pressure body of the turbo-engine, and said second shaft is constituted by the downstream journal of the shaft line of the low pressure body of said turbo-engine.

* * * * *

UNITED STATES PATENT AND TRADEMARK OFFICE
CERTIFICATE OF CORRECTION

PATENT NO. : 4,884,903

DATED : DECEMBER 5, 1989

INVENTOR(S) : LUCIEN PHAM ET AL.

It is certified that error appears in the above-identified patent and that said Letters Patent is hereby corrected as shown below:

Column 1, line 56, change "intershaft" to --inter-shaft--.

Signed and Sealed this

Twenty-seventh Day of November, 1990

Attest:

HARRY F. MANBECK, JR.

*Attesting Officer*  *Commissioner of Patents and Trademarks*